Patented Nov. 4, 1941

2,261,140

UNITED STATES PATENT OFFICE 2,261,140

THERMOPLASTIC ARTICLES

Frederick R. Conklin, Kingsport, Tenn., and Carl J. Malm, Rochester, N. Y., assignors to Eastman Kodak Company, Rochester, N. Y., a corporation of New Jersey No Drawing. Application May 24, 1939, Serial No. 275,483

4 Claims. (Cl. 106—177)

This invention relates to a thermoplastic molding composition comprising a stable organic acid ester of cellulose, having a butyryl content of 30–55%, a viscosity of 5–75 seconds and 1-2 free hydroxyls per 24 carbon atoms in the cellulose unit and 5–30% (based on the weight of the ester) of a stable, high boiling, low vapor pressure, moisture resistant plasticizer.

Many different compositions of cellulose acetate, or cellulose esters whose acyl content is predominantly acetyl, have been employed in plasticized form in plastic compositions. Although cellulose acetate plastic compositions are desirable for many and varied uses, there are some applications to which these plastics are not well suited. For instance cellulose acetate plastic compositions do not exhibit the best moisture resistance or resistance to weathering and, therefore, their use in situations where a plastic material is exposed to the elements or to water is not entirely satisfactory. Cellulose acetate plastics permit considerable leaching of the plasticizer therefrom by water and therefore are not so suitable for products subjected to immersion in water.

Cellulose acetate does not permit of the use of some of the more desirable plasticizers therewith due to its poor compatibility with most of the moisture-resistant, high molecular weight compounds suitable for this purpose. Also cellulose acetate plastics require a large proportion of plasticizer to assure a working temperature low enough to not discolor or otherwise degrade the cellulose acetate. Other points where improvement in cellulose ester plastics is desirable is in the wet strength of the product, the flow, the heat resistance, and the uniformity of the strength with variation in temperatures. All of these characteristics are vastly improved in the plastic composition constituting the instant invention.

An object of our invention is to provide a thermoplastic composition having good permanence and resistance to weathering and, therefore little, if any tendency to warping, shrinking, leaching out of the plasticizer, discoloration, loss of strength and the like. Another object of our invention is to provide a thermoplastic composition which is superior to a cellulose acetate molding composition in having easier flow, better wet strength, better resistance to hot water, more uniformity in strength with variation of temperature and which (due to easier flow and sharper melting characteristics) permits the use of less pressure in injection molding. Other objects of our invention will appear herein.

We have found that the combination of a cellulose acetate butyrate, having a butyryl content of 30–55%, a viscosity of 5–75 seconds (1:4 acetone), 1-2 free hydroxyls per 24 carbon atoms in the cellulose unit and good stability (as shown by having a char point of at least 260° C.) with 5–30% of a stable high boiling, low vapor pressure, moisture resistant plasticizer, forms a thermoplastic composition from which molded products can be made having high permanence by reason of high resistance to moisture and leaching. We have found not only that the products resulting from such compositions are better but also that such a composition is more easily molded than a cellulose acetate plastic composition due to its better flow and sealing characteristics. This is especially outstanding in injection molding processes.

The cellulose esters, which we have found to be most suitable for use in compositions in accordance with our invention, have good stability as evidenced by the fact that they have a char point of at least 260° C. and preferably approximately 300° C. The esters, which have been found to be most suitable in our novel molding composition, are cellulose acetate butyrates, having a butyryl content of 30–55%, which have been slightly hydrolyzed, such as from one-fourth to one-half of the way down to the diester or, in other words, an ester having about 1-2 hydroxyls per 24 carbon atoms. Cellulose acetate butyrates, are the esters with which we have principally worked and as these esters, containing substantially no other acyl groups than acetyl and butyryl have proven to be quite satisfactory, it is to these esters that our invention is particularly directed. The invention, however, includes within its scope organic acid esters of cellulose containing 30–55% of butyryl. The remainder of the acyl present may be any aliphatic acid radical of at least two carbon atoms.

The cellulose esters, which we have employed, have been made by reacting upon cellulose with a reaction mixture in which butyric anhydride is employed, because to obtain high butyryl esters it is necessary to use mainly butyric anhydride as the anhydride in the reaction mixture. These esters may be prepared as described in Gardner Patent No. 2,113,301 of April 5, 1938, or as described in the Malm and Kirton application referred to below. The esters were stabilized in accordance with the process disclosed and claimed by Malm and Kirton in their Patent No. 2,250,201, dated July 22, 1941. Our invention is restricted to the use of esters which have been stabilized in accordance with the Malm and Kirton process or which have a stability which is equivalent to that of esters prepared according to that process (have a char point of at least 260° C. and preferably 300° C. or more). An ester, which has been found to be particularly satisfactory in our invention, is one having a butyryl content of 35-38%, substantially the remainder of the acyl being acetyl, which has been hydrolyzed approximately one-third of the way down to the diester 1½ free hydroxyls per 24 carbon atoms in the cellulose unit) and which has a char point of at least 280° C.

Our invention is restricted to the use of stable, high molecular weight, moisture resistant, high boiling point, low vapor pressure plasticizers in our plastic compositions. The term "high boiling point" as applied to the plasticizers is a relative term in that the plasticizers which are suitable for use in our plastic composition have higher boiling points than those of the plasticizers usually used for plasticizing cellulose acetate plastics. These plasticizers or suitable mixtures thereof may be incorporated with the cellulose acetate butyrates specified, in the ratio of 5-30 parts of plasticizers per 100 parts of cellulose ester which ratio is referred to herein as 5-30% of plasticizer. Many of the plasticizers, which come under the above classification and hence are suitable for use in our compositions, fall within the following groups:

1. Esters of organic, dibasic acids and aliphatic mono-hydric alcohols of 4-6 carbon atoms such as dibutyl sebacate, dibutyl phthalate and diamyl phthalate.
2. Esters of aliphatic, long-chain acids and lower aliphatic mono-hydric alcohols, such as methyl stearate, butyl stearate and methoxyethyl stearate.
3. Esters of aliphatic, long-chain alcohols and lower mono-basic aliphatic acids, such as cetyl acetate, cetyl propionate and cetyl lactate.
4. Esters of phosphoric acid and phenols or derivatives of phenols, such as triphenyl phosphate and tricresyl phosphate.

Some of the plasticizers which we have found to be suitable are: triphenyl phosphate, tricresyl phosphate, ortho-cresyl paratoluene sulfonate, diamyl phthalate, dibutyl phthalate, dipropyl phthalate, di-2-ethyl butyl phthalate, di-2-ethyl butyl adipate, diamyl sebacate, dibutyl sebacate, di-2-ethyl butyl sebacate, dibutyl azelate, di-2-ethyl butyl azelate, methyl stearate, methyl palmitate, ethyl palmitate, ethyl myristate, and butyl myristate. Mixtures of plasticizers, such as equal parts of triphenyl phosphate and dibutyl sebacate or equal parts of triphenyl phosphate and methyl stearate, may be employed. Stable, high butyryl cellulose acetate butyrate requires less plasticizer for a suitable working temperature than does cellulose acetate. Therefore, 5-20% of most of the plasticizers designated, is sufficient to form a good thermoplastic composition, the use of more than this proportion being largely optional. As this combination of stable, high butyryl acetate butyrate and stable low vapor pressure moisture-resistant plasticizer resists leaching out of the plasticizer by water, the plasticizer is retained substantially throughout the life of the plastic and also there is no tendency to blushing in the product, after long exposure to moisture.

The plastic compositions in accordance with our invention should be substantially free of moisture, (not more than about .5%). They may take the physical form most suited for the use to which they are put. For instance, they may be in the form of sheets, slabs, granules or powder. If desired, suitable coloring materials, such as dyes, pigments, bits of colored material, metallic particles, or the like, may be incorporated therein. Thermoplastic compositions, in accordance with our invention, can be suitably prepared by the hot-roll process described in Conklin Patent No. 2,048,686 of July 28, 1936, or by that described in the Conklin Patent No. 2,155,303 of April 18, 1939.

A suitable composition in accordance with our invention may be prepared by mixing together a slightly hydrolyzed cellulose acetate butyrate, having a butyryl content of 37.5%, an acetyl content of 13% and a char point of 295° C., having been stabilized by the process of Malm and Kirton Patent No. 2,250,201, and approximately 10% of a plasticizer consisting of equal parts of triphenyl phosphate and dibutyl sebacate. The mass is then subjected to kneading on rolls having a temperature within the range 275-325° F. which will aid in thoroughly incorporating the plasticizer and thereby convert the whole to a completely homogeneous mass. The plasticized sheet thus prepared may be directly worked up, such as by pressing upon a hot platen press or in a mold, or it may be cut up into strips for molding into desired shapes, or it may be cooled and broken up or granulated into small particles which may be remolded in much the same manner as molding powders.

A molding composition was prepared in a similar manner using a stable, slightly hydrolyzed, butyric acid ester of cellulose having a butyryl content of approximately 52% and a char point of approximately 300° C. and approximately 6% of methyl stearate. A homogeneous mass eminently suitable for the manufacture of molded products was obtained.

A stable cellulose acetate butyrate, having a butyryl content of 32% and containing 1½ free hydroxyls per 24 carbon atoms in the cellulose unit was mixed with approximately 20% of a mixture of equal parts of diamyl phthalate and triphenyl phosphate to form a completely homogeneous mass by working up with hot rolls as described. The resulting composition was eminently suitable for the manufacture of molded products.

A stable, slightly hydrolyzed cellulose acetate butyrate, having a butyryl content of 37.5%, an acetyl content of 13% and a char point of 295° C. mixed with approximately 28% of dibutyl phthalate, was kneaded on hot rolls as described above. A homogeneous mass, suitable for the manufacture of molded products was obtained.

The thermoplastic molding compositions, in accordance with our invention, have good permanence and therefore should be substantially free from substances which will have unstabilizing tendencies such as resins. The presence of volatile solvents is not necessary or even desirable to assure a satisfactory composition for the manufacture of molded products of good quality.

Our thermoplastic compositions may be employed for making various molded articles, such as those for which cellulose acetate plastics have heretofore been used. In addition, our plastic compositions are particularly adapted to the making of objects which are exposed to water or weathering, such as tooth brush handles, artificial fish baits, phonograph records, fountain pen barrels, exterior fittings for automobiles, such as door handles, radiator ornaments, window frames, etc. These objects, if made from organic acid esters of cellulose in which acetyl predominates may warp in use and lack permanence. When made from our thermoplastic compositions, these objects exhibit good permanence due to their resistance to water, weather and moderate heat.

The superiority of our plastic material over cellulose acetate plastic material is shown by comparison of their physical properties especially where resistance to moisture or heat is concerned. The cellulose acetate plastics compared with our plastics, as pointed out below, consisted of a mixture of good quality hydrolyzed cellulose acetate as ordinarily used in thermoplastic compositions and 37.5–54% of a plasticizer. The plasticizers used were dimethyl phthalate, diethyl phthalate and tripropionin, in some cases being mixed with triphenyl phosphate. It was necessary to use the proportions of plasticizer designated to form a satisfactory plastic composition with the cellulose acetate.

The plastic compositions, in accordance with our invention, which were compared with the cellulose acetate plastics essentially consisted of a mixture of slightly hydrolyzed cellulose acetate butyrates, having butyryl contents of 35–40% and 5–20% of stable, high boiling, low vapor pressure moisture-resistant plasticizers. This proportion of plasticizer was all that was necessary to give satisfactory plastic compositions. Some of the plasticizers employed were dibutyl sebacate, diamyl phthalate, triphenyl phosphate, and methyl stearate.

Physical tests bore out what was evident, namely that our plastic composition was resistant to the effect of moisture and heat as compared to cellulose acetate plastics. It was found that the tensile strength of our plastic material, while wet, was distinctly higher. This was determined by testing specimens having dimensions of 5"x½"x0.2" with the middle section ground down to ⅜" which had been immersed in water at room temperature until saturated, on an Olsen hydraulic universal testing machine. The tensile strength is given as the force required to break the specimen by extension. The wet tensile strength of the cellulose acetate plastics averaged about 3000 lbs. the highest wet tensile strength recorded being 3310 lbs. With plastics, in accordance with our invention, the wet tensile strength averaged 4000–5000 lbs., the highest wet tensile strength recorded being 6500 lbs.

Our plastic material is also superior to cellulose acetate plastics in wet flexural strength, being the resistance to breakage when a force is applied tending to bend the body. The flexural strength of specimens 5"x½"x0.2" which had been saturated with water was determined on an Olsen tester. The wet flexural strength of the cellulose acetate plastics averaged around 3000–3500 lbs. while that of the plastics in accordance with our invention averaged around 6000–7000 lbs.

The cellulose acetate plastics were also compared with plastics in accordance with our invention, as to the loss of plasticizer by leaching with water. This test was carried out by pressing each sample to a sheet 0.05" thick. Pieces 1"x4" were cut from these sheets, dried and weighed. The pieces were placed in individual quart containers filled with water and kept at 100° F. for the designated times. Samples of each were removed at the end of 24, 72, 144 and 240 hours and were dried and weighed. The percentages of plasticizer, based on the weight of the plastic which leached out with each type of plastic, were as follows:

| | 24 hours | 72 hours | 144 hours | 240 hours |
| --- | --- | --- | --- | --- |
| | Per cent | Per cent | Per cent | Per cent |
| Cellulose acetate plastic | 1½–4½ | 2¾–6¾ | 3¾–8½ | 5–10¾ |
| Conklin & Malm plastic | Less than ½ | Less than ¾ | Less than ¾ | Less than ¾ |

Our plastics were found to take up much less water by immersion than does cellulose acetate plastics. The gain on immersion of a large number of samples of the two types of plastics was determined by finding the percent increase in weight of dry specimens on being immersed in water for 48 hours at room temperature. Whereas the average percent gain of cellulose acetate plastic was 2.5%, that of the plastic of our invention averaged around only 1.5%. The sample of cellulose acetate plastic gaining the least had a gain of 1.9%, while the sample of our plastic having the lowest increase, gained only 0.9%. These results do not, however, show the total gain of water by the cellulose acetate plastic, due to the leaching out of the plasticizer and replacement by water therefrom, which additional intake of water was not accounted for by the figure given.

The gain in weight at 80% relative humidity of a large number of samples of the two types of plastics was determined. The gain of the cellulose acetate plastics averaged around 1.1% while our plastics averaged a gain of around .75%. The lowest gain of a cellulose acetate plastic sample was .9% while the lowest gain of our plastics was .54%.

The loss of weight on heating of a large number of samples of the two types of plastics was determined. Dry specimens were suspended in a dry atmosphere at 150° F. for 48 hours. Whereas the acetate plastic samples exhibited a loss averaging around 0.5%, the loss of weight of the samples of our plastic composition averaged around 0.1%. The lowest weight loss of the acetate samples was .25% and of the samples of our plastic was 0.0. The specimens which were tested for gain on immersion, gain in 80% relative humidity and loss on heating all had dimensions of 3"x¾"x0.2".

As pointed out above, our plastic compositions flow readily at low temperatures even though much smaller amounts of plasticizer are present than have been necessary with cellulose acetate plastic compositions. The flow of a plastic composition is indicated by the amount of travel of that composition under heat and pressure. Obviously, with a better flow, a composition is more easily employed in a molding machine. The flow is designated by the temperature at which the composition will flow one inch in two minutes through a ⅛" orifice at a pressure of 1500 lbs. per square inch. Tests were run using an Olsen Bakelite flow tester. With the following compositions in accordance with our invention in which 100 parts of cellulose acetate butyrate designated plus the amount and kind of plasticizer designated is used, the flow temperatures were approximately as follows:

| Parts of plasticizer | Diamyl phthalate | Triphenyl phosphate | Methyl stearate | Triphenyl phosphate, tricresyl phosphate | Triphenyl phosphate, methyl stearate | Dibutyl sebacate | Diamyl phthalate, triphenyl phosphate |
|---|---|---|---|---|---|---|---|
| | °C. | °C. | °C. | °C. | °C. | °C. | °C. |
| 5 | 154 | 155 | 156 | 156 | 158 | 154 | 156 |
| 10 | 145 | 144 | 147.5 | 147.5 | 143 | 143 | 145 |
| 15 | 133 | 138 | 143 | 142 | 138 | 134 | 135 |
| 20 | 130 | 132 | 140 | 134 | 133 | 128 | 129 |
| 30 | 119 | 120 | 133 | 124 | 123 | 116 | 114 |

Where mixtures of plasticizers were employed, the two components were present in equal amounts.

With plastic compositions employing cellulose acetate with much larger amounts of plasticizers therewith, the flow temperatures consistently ran higher than with our plastic compositions. For instance, the amounts and kinds of plasticizers used per 100 parts of cellulose acetate and the approximate flow temperatures (tested in the same manner as above) were as follows:

| Parts of plasticizer | Plasticizer | Flow temperature |
|---|---|---|
| 37.5 | Tripropionin | 145 |
| 54 | {48 triphenyl phosphate, 52 tripropionin} | 143 |
| 48 | {50 dimethyl phthalate, 50 diethyl phthalate} | 135 |
| 40.4 | Dimethyl phthalate | 132 |
| 51.8 | {30 dimethyl phthalate, 45 diethyl phthalate, 25 triphenyl phosphate} | 140 |

We found that our cellulose acetate butyrate plastic compositions with a tensile strength of 5000 lbs. per square inch have a much more desirable flow than a cellulose acetate plastic of the same tensile strength (measured by the Tinius-Olsen flow tester). This facilitates the molding operation, particularly in injection molding.

The toughness of our thermoplastic compositions exceeds that of cellulose acetate plastic compositions, as shown by a greater elongation, using materials of the same tensile strength. Also, as pointed out above, our thermoplastic products are superior to those of cellulose acetate in resistance to moisture.

Another advantage of our composition is that when it has been heated beyond a certain critical temperature, its increase in rate of flow is very rapid which is especially desirable in molding processes. In other words, our new molding composition much more nearly approaches a sharp melting point than do cellulose acetate compositions. Whereas, upon heating a cellulose acetate molding composition, it merely gradually softens as it approaches the char point, our new cellulose acetate butyrate molding compositions arrive at near-fluidity long before reaching the char point. As will be apparent, this is of great advantage in injection molding of such compositions. Whereas the acetate composition must be heated to higher temperatures and injected under higher pressures, our novel acetate butyrate compositions reach much greater fluidity at considerably lower temperatures and can thus be injection molded at much lower pressures, thus requiring less work, less powerful machines and running much less risk of degrading the molding composition. Thus, our invention makes possible, molding with much greater economy to produce a far better molded article than heretofore.

As pointed out above, products prepared from our thermoplastic composition are also eminently suited for use under severe conditions, such as where the products are exposed to water and/or the weather. This includes not only humidity but also the effect of ultra-violet and infra-red rays. Due to the high permanence of these products, there is no deterioration in their extended use.

We claim:

1. A heat-formed article essentially consisting of a slightly hydrolyzed organic acid ester of cellulose containing approximately 30–55% of butyryl, the remaining acyl substituents being aliphatic acid groups of at least 2 carbon atoms and about 1–2 free hydroxyls per 24 cellulose carbon atoms, which ester has a char point of at least 260° C. and a viscosity of 5–75 seconds (1 part in 4 parts of acetone) and 5–30% (based on the weight of the cellulose ester) of a stable, high boiling, low vapor pressure, moisture-resistant plasticizer mixture essentially consisting of equal proportions of a triaryl phosphate and a compound selected from the group consisting of methyl stearate, dibutyl sebacate and diamyl phthalate, which article has high permanence, good resistance to weathering, moisture and moderate heat, and good strength at low temperatures.

2. A heat-formed article essentially consisting of a slightly hydrolyzed organic acid ester of cellulose containing approximately 30–55% of butyryl, the remaining acyl substituents being aliphatic acid groups of at least 2 carbon atoms and about 1–2 free hydroxyls per 24 cellulose carbon atoms, which ester has a char point of at least 260° C. and a viscosity of 5–75 seconds (1 part in 4 parts of acetone) and 5–30% (based on the weight of the cellulose ester) of a stable, high boiling, low vapor pressure, moisture-resistant plasticizer mixture essentially consisting of equal proportions of triphenyl phosphate and methyl stearate, which article has high permanence, good resistance to weathering, moisture and moderate heat, and good strength at low temperatures.

3. A heat-formed article essentially consisting of a slightly hydrolyzed organic acid ester of cellulose containing approximately 30–55% of butyryl, the remaining acyl substituents being aliphatic acid groups of at least 2 carbon atoms and about 1–2 free hydroxyls per 24 cellulose carbon atoms, which ester has a char point of at least 260° C. and a viscosity of 5–75 seconds (1 part in 4 parts of acetone) and 5–30% (based on the weight of the cellulose ester) of a stable, high boiling, low vapor pressure, moisture-resistant plasticizer mixture essentially consisting of equal proportions of triphenyl phosphate and dibutyl sebacate which article has high permanence, good resistance to weathering, moisture and moderate heat, and good strength at low temperatures.

4. A heat-formed article essentially consisting of a slightly hydrolyzed organic acid ester of cellulose containing approximately 30–55% of butyryl, the remaining acyl substituents being aliphatic acid groups of at least 2 carbon atoms and about 1-2 free hydroxyls per 24 cellulose carbon atoms, which ester has a char point of at least 260° C. and a viscosity of 5-75 seconds (1 part in 4 parts of acetone) and 5-30% (based on the weight of the cellulose ester) of a stable, high boiling, low vapor pressure, moisture-resistant plasticizer mixture essentially consisting of equal proportions of triphenyl phosphate and diamyl phthalate, which article has high permanence, good resistance to weathering, moisture and moderate heat, and good strength at low temperatures.

FREDERICK R. CONKLIN.
CARL J. MALM.